(12) United States Patent
Hoshi et al.

(10) Patent No.: US 12,434,686 B2
(45) Date of Patent: Oct. 7, 2025

(54) METHOD FOR CONTROLLING VEHICLE, AND VEHICLE

(71) Applicant: Nissan Motor Co., Ltd., Kanagawa (JP)

(72) Inventors: Kiyoshi Hoshi, Kanagawa (JP); Yoshihiko Misao, Kanagawa (JP); Hirofumi Miyauchi, Kanagawa (JP); Azusa Kobayashi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/689,330

(22) PCT Filed: Sep. 7, 2021

(86) PCT No.: PCT/JP2021/032915
§ 371 (c)(1),
(2) Date: Mar. 5, 2024

(87) PCT Pub. No.: WO2023/037420
PCT Pub. Date: Mar. 16, 2023

(65) Prior Publication Data
US 2024/0326777 A1    Oct. 3, 2024

(51) Int. Cl.
*F02B 3/08* (2006.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 40/12* (2013.01);
(Continued)

(58) Field of Classification Search
CPC ...... B60W 20/15; B60W 10/06; B60W 10/08; B60W 40/12; F01N 3/021; F01N 3/025;
(Continued)

(56) References Cited

U.S. PATENT DOCUMENTS

2018/0106206 A1    4/2018  Tsunoda et al.
2020/0139957 A1*   5/2020  Muta ................. B60L 50/62
(Continued)

FOREIGN PATENT DOCUMENTS

CN    102365442 A  *  2/2012  ............ F02D 13/04
CN    106837476 A  *  6/2017  .......... B60W 30/143
(Continued)

OTHER PUBLICATIONS

Tomohiro_KR_20200087841_A_Hybrid_Vehicle_Control_Method_And_Control_Device (an English-translated version) (Year: 2020).*
(Continued)

*Primary Examiner* — Cuong H Nguyen
(74) *Attorney, Agent, or Firm* — Osha Bergman Watanabe & Burton LLP (57) ABSTRACT

A vehicle includes an engine, a generator, a drive motor, and a filter that collects particulate matter in exhaust gas of the engine. The generator is driven by the engine to generate power. The drive motor is driven with the power generated by the generator. A method for controlling the vehicle includes performing motoring by driving the engine in an operation stop state with the generator, thereby performing fuel cut of the engine and consuming power; prohibiting fuel cut of the engine based on a temperature of the filter; and when a discharge request is made while the fuel cut of the engine is prohibited, performing a power consumption operation in which a negative engine torque is generated in the engine by driving the engine with the generator while performing combustion in the engine.

7 Claims, 9 Drawing Sheets

(51) Int. Cl.
  *B60W 10/08* (2006.01)
  *B60W 20/15* (2016.01)
  *B60W 40/12* (2012.01)
  *F01N 3/021* (2006.01)
  *F02B 3/12* (2006.01)
  *F02D 29/06* (2006.01)
  *F02D 41/38* (2006.01)

(52) U.S. Cl.
  CPC ............ *F01N 3/021* (2013.01); *F02D 29/06* (2013.01); *F02D 41/38* (2013.01); *B60W 2510/0638* (2013.01); *B60W 2710/0627* (2013.01); *B60W 2710/0666* (2013.01); *F02D 2200/0606* (2013.01); *F02D 2200/101* (2013.01)

(58) Field of Classification Search
  CPC .......... F02D 29/06; F02D 41/38; F02D 13/02; F02D 2250/16; F02D 2250/31; F02D 43/00; Y02T 10/70; Y02T 10/62
  USPC .......................................................... 701/22
  See application file for complete search history.

(56) References Cited

U.S. PATENT DOCUMENTS

| | | | | |
|---|---|---|---|---|
| 2020/0164862 | A1* | 5/2020 | Muta | F02D 41/12 |
| 2021/0402978 | A1* | 12/2021 | Tsuyuki | B60W 10/26 |

FOREIGN PATENT DOCUMENTS

| | | | | | |
|---|---|---|---|---|---|
| CN | 108437970 | B | * | 5/2021 | ............ B60K 6/445 |
| DE | 102012203438 | B4 | * | 7/2020 | ........... F16H 61/143 |
| JP | 2004225564 | A | | 8/2004 | |
| JP | 2018065448 | A | * | 4/2018 | ............ B60K 6/445 |
| JP | 6673139 | B2 | * | 3/2020 | ............ B60K 6/445 |
| JP | 2020104668 | A | | 7/2020 | |
| JP | 2020111164 | A | | 7/2020 | |
| JP | 2020112082 | A | * | 7/2020 | |
| JP | 2021054331 | A | | 4/2021 | |
| KR | 20200087841 | A | * | 7/2020 | ............ B60W 10/06 |

OTHER PUBLICATIONS

Whittney_et_al_DE_102012203438_B4_Systems_And_Methods_For_Relaxing_The_Rigidity_Of_A_Final_Drive. (an English-translated version) (Year: 2020).*

Larsson_CN_102365442_A_For_Exhaust_Temperature_Control_Method (an English-translated version) (Year: 2012).*

Sugunaraj, Niroop. Accurate Threshold Estimation For Electronic Control Unit (ECU) Signatures In Vehicular Environments. MS thesis. The University of North Dakota, (Year: 2021).*

An English-translated version of JP-6673139-B2 of Suzuki T (Toyota Motor Corp) (year: 2020).*

An English-translated version of CN-102365442-A of Larsson et al (year: 2012).*

An English-translated version of Toyota'082 (JP 2020112082 A by Shunichi Hara et al) (Year: 2020).*

Sugunaraj, Niroop. Accurate Threshold Estimation for Electronic Control Unit (ECU) Signatures in Vehicular Environments. The University of North Dakota, (Year: 2021).*

Barroso, Daniel G., et al. "Electrified automotive propulsion systems: state-of-the-art review." IEEE Transactions on Transportation Electrification 8.2: 2898-2914; (Year: 2021).*

An English-translated version for patent "Hybrid vehicle control method and control device" KR20200087841A by Nissan Motor (Year: 2020.*

Won, Hyun Woo, et al. "Toward 2030 CO2 targets—high efficiency engine with gasoline compression ignition technology on a hybrid electric vehicle simulation." Proceedings of the Institution of Mechanical Engineers, Part D: Journal of Automobile Engineering 237.7 1668-1680; (Year: 2023).*

An English-translated version for patent CN102365442A by Larsson et al (Volvo Truck Corp) (year: 2012).*

* cited by examiner

METHOD FOR CONTROLLING VEHICLE, AND VEHICLE

TECHNICAL FIELD

The present invention relates to a method for controlling a vehicle and the vehicle.

BACKGROUND ART

JP2018-065448A discloses a hybrid automatic vehicle including an engine in which a filter for removing particulate matter is attached to an exhaust system. In the technique, when an accumulation amount of the particulate matter of the filter is equal to or more than a predetermined accumulation amount and a temperature of the filter is equal to or higher than a predetermined temperature, fuel cut of the engine is prohibited. Accordingly, by continuing the operation of the engine (fuel injection), combustion of the particulate matter caused by oxygen supply and overheating of the filter are suppressed.

SUMMARY OF INVENTION

A series hybrid vehicle includes an engine, a generator, and a drive motor. The generator is driven by the engine to generate power, and the drive motor is driven with the power generated by the generator. In such a vehicle, deceleration can be obtained by performing regeneration by the drive motor during deceleration. The regeneration can be performed when there is room for regeneration in a power balance of the vehicle, that is, when there is room for maximum acceptable power.

Therefore, for example, when a battery is fully charged and there is no room for regeneration, the regeneration cannot be performed, and thus the deceleration cannot be secured. In this case, by making a discharge request and motoring the engine while stopping fuel supply based on the discharge request, it is possible to consume power and increase the room for regeneration. As a result, it is possible to ensure deceleration by the regeneration.

However, when the fuel cut is prohibited to suppress overheating of the filter, the deceleration cannot be secured by using motoring. For this reason, when there is no room for regeneration in a situation where regenerative deceleration is performed while fuel cut is prohibited, there is a concern that the deceleration may not be secured by the regeneration.

The present invention has been made in view of such a problem, and an object thereof is to ensure deceleration while protecting a filter in a situation where regenerative deceleration is performed while fuel cut is prohibited.

In one embodiment of the present invention, a method for controlling a vehicle includes: when a discharge request is made while the fuel cut of the engine is prohibited in a series hybrid vehicle having a filter that collects particulate matter in exhaust gas of the engine, then performing a power consumption operation in which a negative engine torque is generated in the engine by driving the engine with the generator while performing combustion in the engine.

DESCRIPTION OF EMBODIMENTS

Hereinafter, an embodiment of the present invention will be described with reference to the accompanying drawings.

Figure 1:
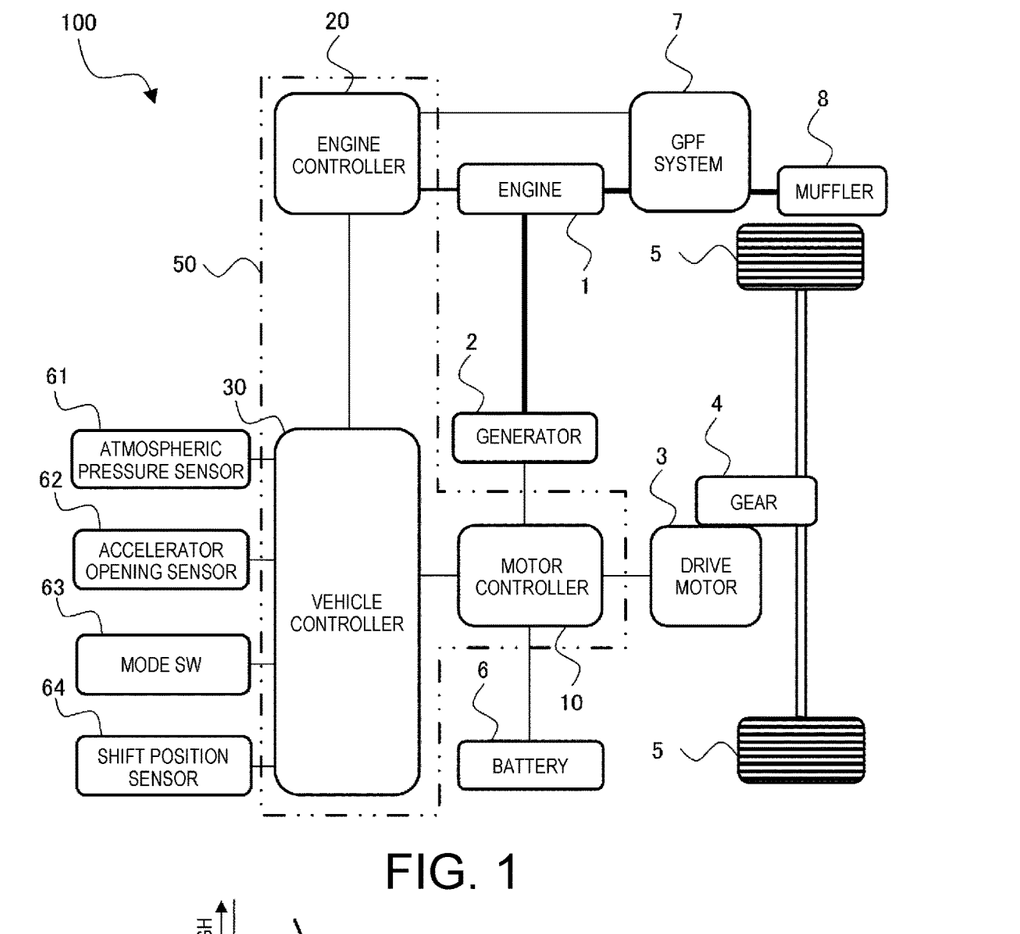
FIG. 1 is a schematic configuration diagram of a vehicle.

FIG. 1 is a schematic configuration diagram of a vehicle 100. The vehicle 100 includes an engine 1, a generator 2, a drive motor 3, a gear 4, drive wheels 5, a battery 6, a gasoline particulate filter (GPF) system 7, and a muffler 8. The vehicle 100 is a series hybrid vehicle and has a series hybrid mode as a traveling mode. When the traveling mode is the series hybrid mode, the vehicle 100 drives the generator 2 with the engine 1 to generate power, and drives the drive motor 3 with the power generated by the generator 2.

The engine 1 is an internal combustion engine and is a gasoline engine. The engine 1 is connected to the generator 2 in a power transmittable manner. The generator 2 is a motor generator for power generation, and performs motoring of the engine 1 in addition to the power generation. The motoring is performed by driving the engine 1 in an operation stop state by the generator 2. The drive motor 3 is a drive motor generator and generates a driving force DP of the vehicle 100. The driving force DP generated by the drive motor 3 is transmitted to the drive wheels 5 via the gear 4 which is a reduction gear. The drive motor 3 is driven with the power from the drive wheels 5 to perform energy regeneration. Energy regenerated as power by the drive motor 3 can be charged into the battery 6.

The battery 6 stores power generated by the generator 2 and power regenerated by the drive motor 3. A discharge request, State of Charge (SOC), is set in the battery 6. The SOC is a parameter indicating a state of charge of the battery 6, and the discharge request SOC is set in advance as a value for defining the full charge of the battery 6. In other words, the full charge of the battery 6 is defined by the discharge request SOC, and the battery 6 is understood to be fully charged when the SOC as a charging rate is 90%, for example.

The GPF system 7 is an exhaust purification system and is provided in an exhaust passage of the engine 1. The GPF system 7 has a GPF, that is, a gasoline particulate filter, and soot, which is particulate matter in exhaust gas of the engine 1, is collected by the GPF. The GPF system 7 includes a GPF temperature sensor and a GPF differential pressure sensor. The GPF temperature sensor detects a GPF temperature T. The GPF temperature T is a bed temperature of the GPF, and the GPF temperature sensor detects, for example, an outlet exhaust temperature of the GPF as an actual temperature of the GPF temperature T. The GPF differential pressure sensor detects a differential pressure between an inlet exhaust pressure and an outlet exhaust pressure of the GPF. A GPF soot accumulation amount S, which is an amount of soot accumulated on the GPF, is estimated based on the differential pressure. The GPF system 7 may include a catalyst such as a three-way catalyst in addition to the GPF. The muffler 8 is provided in the exhaust passage of the engine 1 downstream of the GPF system 7, and reduces exhaust noise.

The vehicle 100 further includes a motor controller 10, an engine controller 20, and a vehicle controller 30. The motor controller 10, the engine controller 20, and the vehicle controller 30 are communicably connected to each other. The motor controller 10 includes one or more microcomputers including a central processing unit (CPU), a read-only memory (ROM), a random access memory (RAM), and an input and output interface (I/O interface). In the motor controller 10, various controls are performed by the CPU executing programs stored in the ROM or the RAM. The same applies to the engine controller 20 and the vehicle controller 30.

The motor controller 10 controls the generator 2 and the drive motor 3. The motor controller 10 further includes a first inverter that is an inverter for the generator 2 and a second inverter that is an inverter for the drive motor 3. These inverters may be understood as a separate configuration from the motor controller 10. The motor controller 10 controls the generator 2 and the drive motor 3 by controlling the first inverter and the second inverter.

The first inverter is connected to the generator 2 and the battery 6. The first inverter converts an alternating current supplied from the generator 2 into a direct current and supplies the direct current to the battery 6. Accordingly, the battery 6 is charged with the power generated by the generator 2. The first inverter further converts a direct current supplied from the battery 6 into an alternating current and supplies the alternating current to the generator 2. Accordingly, the generator 2 is driven with the power of the battery 6. The same applies to the second inverter, the drive motor 3, and the battery 6. Signals of the current, the voltage, and the SOC are also input to the motor controller 10 from the generator 2, the drive motor 3, and the battery 6.

The engine controller 20 controls the engine 1. Signals from the GPF temperature sensor and the GPF differential pressure sensor are input to the engine controller 20. These signals can be further input to the vehicle controller 30 via the engine controller 20. The engine controller 20 prohibits fuel cut of the engine 1 based on the GPF temperature T and the GPF soot accumulation amount S (in other words, based on the GPF temperature T corresponding to the GPF soot accumulation amount S).

Figure 2:
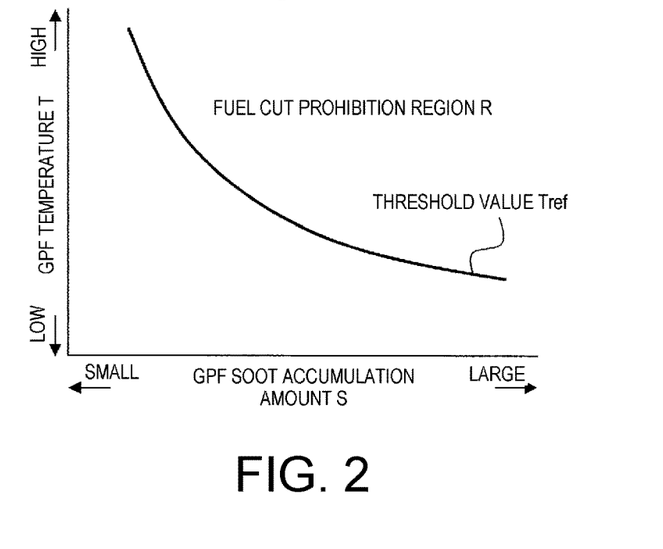
FIG. 2 is a diagram showing an execution region of fuel cut prohibition.

FIG. 2 is a diagram showing a fuel cut prohibition region R. As shown in FIG. 2, the fuel cut prohibition region R is set in advance by map data according to the GPF soot accumulation amount S and the GPF temperature T. The fuel cut prohibition region R is a region in which the GPF temperature T is higher than a threshold value Tref. The threshold value Tref is a value for defining the fuel cut prohibition region R, and is set in advance according to the GPF soot accumulation amount S. As the GPF soot accumulation amount S increases, the GPF is more likely to overheat due to soot combustion. For this reason, the threshold value Tref is set to decrease as the GPF soot accumulation amount S increases.

Returning to FIG. 1, the vehicle controller 30 integrally controls the engine 1, the generator 2, and the drive motor 3. Signals from an atmospheric pressure sensor 61 for detecting atmospheric pressure, an accelerator opening sensor 62 for detecting an accelerator opening APO, a mode SW 63 for selecting a drive mode by a driver operation, and a shift position sensor 64 for detecting a shift position (range) selected by the driver operation are input to the vehicle controller 30. The vehicle controller 30 constitutes a controller 50 together with the motor controller 10 and the engine controller 20.

Figure 3:
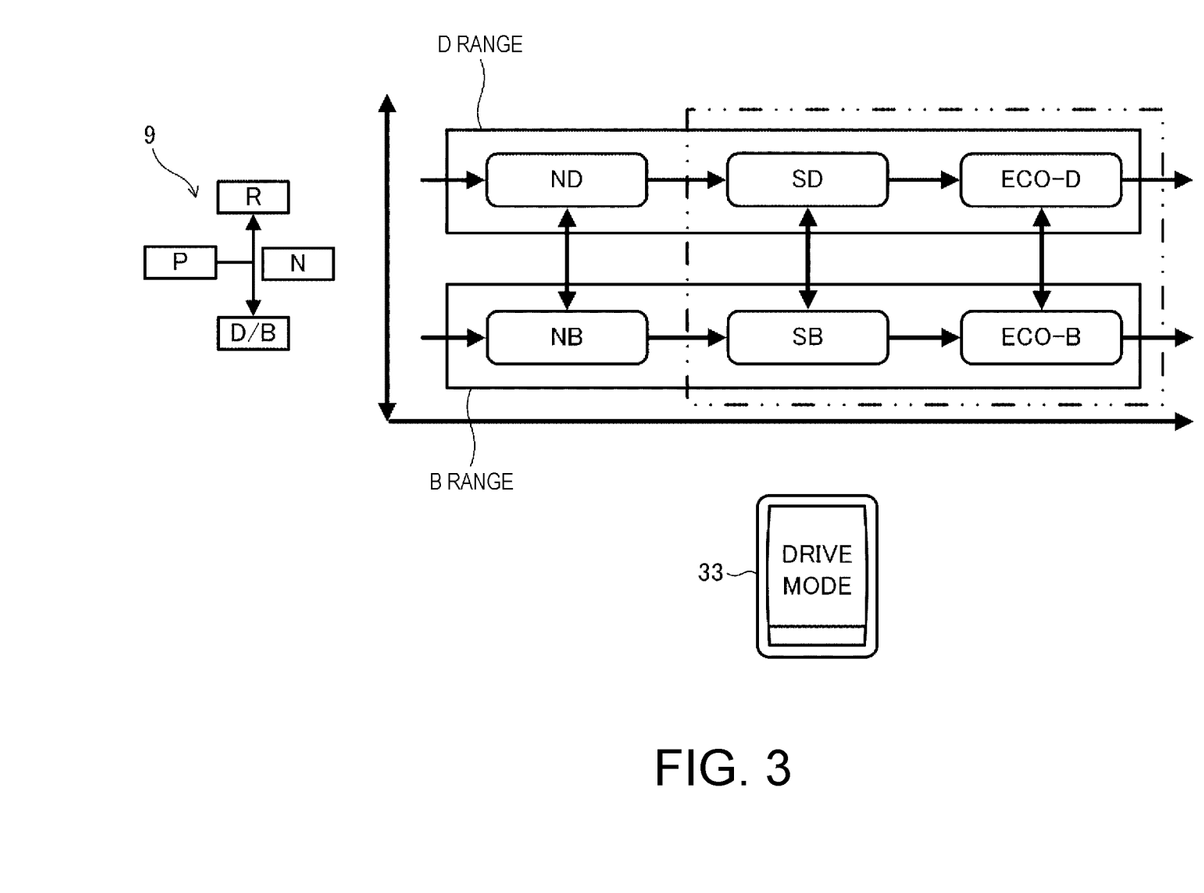
FIG. 3 is an explanatory diagram of a shift position and a drive mode.

FIG. 3 is an explanatory diagram of the shift position and the drive mode. The vehicle 100 further includes a shifter 9. The shifter 9 is a device for selecting a shift position by a driver operation, and the driver operation is performed by a shift lever operation or a switch operation to a gate corresponding to each shift position. The shifter 9 is a momentary shifter. In the momentary shifter 9, the shift lever released from the driver operation autonomously returns to a home position which is a neutral position.

The shift positions selectable with the shifter 9 include a P range (parking range), an R range (reverse range), and an N range (neutral range) as well as a D range which is a first forward range and a B range which is a second forward range. The D range and the B range are selected by a shift lever operation to a D/B gate common to the D range and the B range. According to the shift lever operation to the D/B gate, the B range is selected when the D range is selected, and the D range is selected when the B range is selected. When the ranges other than the D range and the B range are selected, the D range is selected by the shift lever operation to the D/B gate.

The drive mode selectable by the mode SW 63 includes an N mode, an S mode, and an ECO mode. The N mode is a mode (normal mode) in which acceleration is performed by an accelerator pedal operation. Therefore, in the N mode, strong regenerative deceleration is not performed by the accelerator pedal operation. Each of the S mode and the ECO mode is a mode (one-pedal mode) in which acceleration and regenerative deceleration are performed by the accelerator pedal operation, and the ECO mode is a mode more suitable for fuel-efficient driving than the S mode. Each time the mode SW 63 is pressed, the drive mode is changed in an order of the N mode, the S mode, and the ECO mode, and returns to the N mode after the ECO mode.

In the S mode or the ECO mode, the drive motor 3 performs the regeneration to generate the deceleration. In other words, the deceleration is a negative acceleration and is represented by a negative value. In the S mode, a regeneration limit amount (magnitude of the regeneration limit) is set larger than that in the ECO mode. In other words, the regeneration is not suppressed in the S mode compared to the ECO mode. Therefore, the power obtained by the regeneration and the magnitude of the generated deceleration in the S mode are larger than those in the ECO mode. The ECO mode constitutes a first drive mode, and the S mode constitutes a second drive mode.

In the vehicle 100, the deceleration can be obtained by performing the regeneration by the drive motor 3 during the deceleration. The regeneration can be performed when there is room for regeneration in a power balance of the vehicle 100, that is, when there is room for maximum acceptable power.

Therefore, for example, when there is no room for regeneration as a result of full charge of the battery 6, the regeneration cannot be performed, and thus the deceleration cannot be ensured. In this case, by making a discharge request and motoring the engine 1 based on the discharge request, it is possible to consume power and increase the room for regeneration. As a result, it is possible to ensure deceleration by the regeneration.

However, when the fuel cut is prohibited to suppress overheating of the GPF, the deceleration cannot be secured by using motoring. For this reason, when there is no room for regeneration in a situation where the deceleration is performed while fuel cut is prohibited, the deceleration cannot be secured by the regeneration. As a result, an unintended change in deceleration occurs, and there is a concern that a driver may feel uncomfortable.

In view of such circumstances, the vehicle 100 is further configured as follows.

Figure 4:
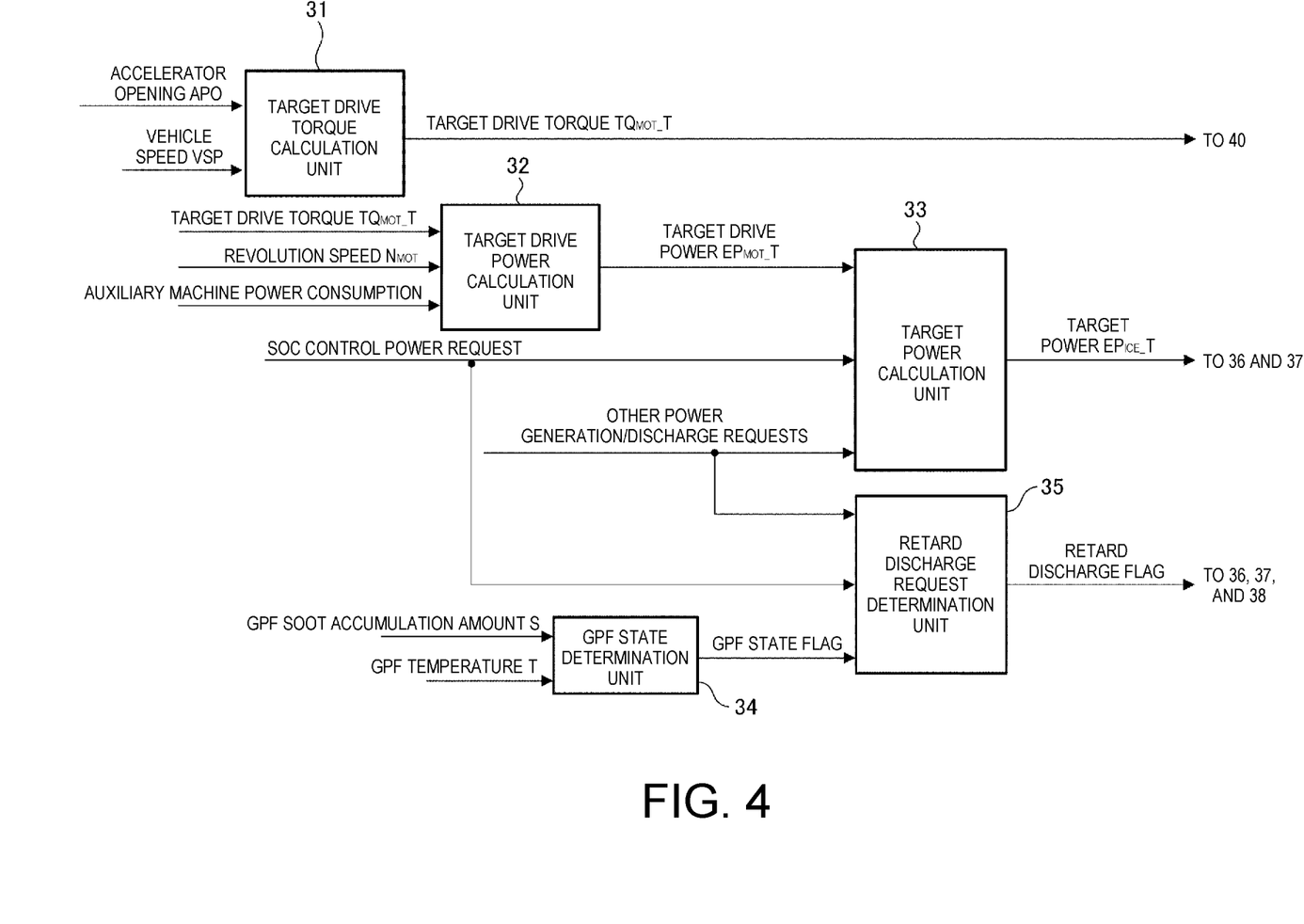
FIG. 4 is a first block diagram showing processing of a vehicle controller.
Figure 5:
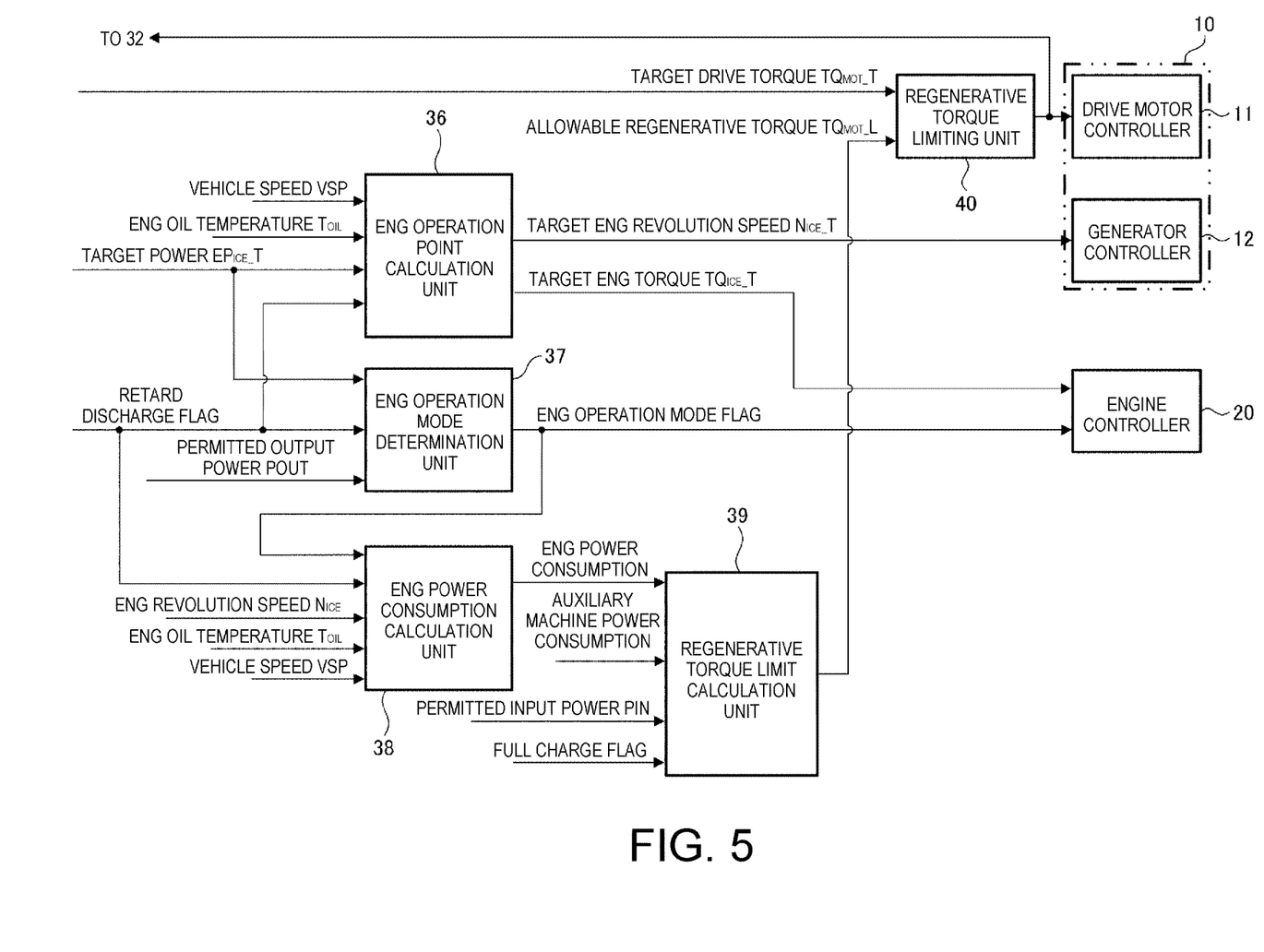
FIG. 5 is a second block diagram showing the processing of the vehicle controller.

FIGS. 4 and 5 are block diagrams showing processing of the vehicle controller 30. The vehicle controller 30 includes a target drive torque calculation unit 31, a target drive power calculation unit 32, a target power calculation unit 33, a GPF state determination unit 34, a retard discharge request determination unit 35, an ENG operation point calculation unit 36, an ENG operation mode determination unit 37, an ENG power consumption calculation unit 38, a regenerative torque limit calculation unit 39, and a regenerative torque limiting unit 40.

The target drive torque calculation unit 31 calculates a target drive torque $TQ_{MOT\_T}$ of the drive motor 3 based on the accelerator opening APO and a vehicle speed VSP. The target drive torque $TQ_{MOT\_T}$ can be set in advance by map data according to the accelerator opening APO and the vehicle speed VSP. The target drive torque calculation unit 31 calculates a negative target drive torque $TQ_{MOT\_T}$, that is, a target regenerative torque, during regeneration. The calculated target drive torque $TQ_{MOT\_T}$ is input to the regenerative torque limiting unit 40.

The target drive power calculation unit 32 calculates target drive power $EP_{MOT\_T}$ of the drive motor 3 based on the target drive torque $TQ_{MOT\_T}$, a revolution speed $N_{MOT}$ of the drive motor 3, and auxiliary machine power consumption. The target drive torque $TQ_{MOT\_T}$ subjected to limitation by the regenerative torque limiting unit 40 to be described later is input to the target drive power calculation unit 32. The auxiliary machine power consumption is power consumption of auxiliary machines that consume power, such as an air conditioner and a power steering device. The calculated target drive power $EP_{MOT\_T}$ is input to the target power calculation unit 33.

In addition, an SOC control power request and other power generation and discharge requests are input to the target power calculation unit 33. The SOC control power request is the power generation and discharge requests corresponding to the SOC, and includes a discharge request performed when the battery 6 is fully charged, and a power generation request performed when the SOC is equal to or less than a predetermined value, that is, when the amount of charge of the battery 6 becomes small. The other power generation and discharge requests are power generation and discharge requests other than the SOC control power request, and include, for example, a lower limit power generation request for realizing performance such as generated power for realizing required drive power, an upper limit power generation request (power generation stop request) for protecting components related to power generation such as the generator 2 and the battery 6, and a discharge request of surplus regenerative power that is regenerative power for realizing deceleration by regeneration and cannot be charged to the battery 6.

The target power calculation unit 33 calculates target power $EP_{ICE\_T}$ for power generation or discharge performed by the engine 1 based on the input. The target power calculation unit 33 calculates the final target power $EP_{ICE\_T}$ by prioritizing the various requests described above and arbitrating the power according to the various requests, and then reflecting the results thereof in the target drive power $EP_{MOT\_T}$. The calculated target power $EP_{ICE\_T}$ is input to the ENG operation point calculation unit 36 and the ENG operation mode determination unit 37.

The GPF state determination unit 34 determines a state of the GPF based on the GPF soot accumulation amount S and the GPF temperature T. The GPF state determination unit 34 refers to the map data shown in FIG. 2, and determines whether the state of the GPF based on the GPF soot accumulation amount S and the GPF temperature T is included in the fuel cut prohibition region R.

When the state of the GPF is included in the fuel cut prohibition region R, that is, when a fuel cut prohibition condition is satisfied, the GPF state determination unit 34 sets a GPF state flag to ON (fuel cut prohibition request). The fuel cut prohibition condition is a condition determined based on the GPF temperature T, and is satisfied when the GPF temperature T is higher than the threshold value Tref. When the state of the GPF is not included in the fuel cut prohibition region R, that is, when the fuel cut prohibition condition is not satisfied, the GPF state determination unit 34 sets the GPF state flag to OFF (fuel cut permitted).

The GPF state flag is input from the GPF state determination unit 34 to the retard discharge request determination unit 35. In addition, the other power generation and discharge requests and the SOC control power request are input to the retard discharge request determination unit 35.

The retard discharge request determination unit 35 determines the presence or absence of a retard discharge request based on the input. The retard discharge is an example of a power consumption operation in which the engine 1 is driven by the generator 2 to generate a negative ENG torque $TQ_{ICE}$ in the engine 1 while performing combustion in the engine 1. In the power consumption operation, the engine 1 and the generator 2 create a state of ENG torque $TQ_{ICE}$<friction torque, thereby discharging the battery 6 while performing combustion in the engine 1. At this time, in the retard discharge, an ignition timing is retarded and combustion is performed in the engine 1. In this case, since the combustion becomes slow and the ENG torque $TQ_{ICE}$ decreases, the state of ENG torque $TQ_{ICE}$<friction torque is easily created.

When there is a discharge request and the GPF state flag is ON (that is, when there is a fuel cut prohibition request), the retard discharge request determination unit 35 sets a retard discharge flag to ON. When the GPF state flag is OFF (that is, when the fuel cut is permitted), the retard discharge flag is turned OFF.

A case where the discharge request included in the SOC control power request and the discharge request of the surplus regenerative power included in the other power generation and discharge requests overlap each other is also included in the case where there is a discharge request. For this reason, also in this case, if the GPF state flag is ON, the retard discharge flag is turned ON. Accordingly, it is possible to realize a discharge request for discharging in an optimum manner in light of the state of the GPF.

The retard discharge flag is input from the retard discharge request determination unit 35 to the ENG operation point calculation unit 36, the ENG operation mode determination unit 37, and the ENG power consumption calculation unit 38. In addition to the target power $EP_{ICE\_T}$ and the retard discharge flag, the vehicle speed VSP and an ENG oil temperature $T_{OIL}$ are further input to the ENG operation point calculation unit 36.

The ENG operation point calculation unit 36 calculates a target operation point of the engine 1 based on the input. The target operation point can be set in advance by map data according to the target power $EP_{ICE\_T}$. When the target power $EP_{ICE\_T}$ is positive, power is generated. In this case, a target ENG torque $TQ_{ICE\_T}$ is calculated as the target operation point in order to operate the engine 1 for power generation at the target ENG torque $TQ_{ICE\_T}$. When the target power $EP_{ICE\_T}$ is negative, motoring or retard discharge is performed. The negative target power $EP_{ICE\_T}$ corresponds to a discharge request for performing discharge by motoring or retard discharge.

The motoring is performed when the retard discharge flag is OFF. When the motoring is performed, a target ENG revolution speed $N_{ICE\_T}$ is calculated as the target operation point in order to drive the generator 2 at the target ENG revolution speed $N_{ICE\_T}$.

The retard discharge is performed when the retard discharge flag is ON. When the retard discharge is performed, the target ENG revolution speed $N_{ICE\_T}$ and the target ENG torque $TQ_{ICE\_T}$ are calculated as the target operation points. This is because the engine 1 is operated at the target ENG torque $TQ_{ICE\_T}$ and the generator 2 is driven at the target ENG revolution speed $N_{ICE\_T}$ to perform discharging. The target ENG revolution speed $N_{ICE\_T}$ is set in advance as follows according to the required discharge power that is the negative target power $EP_{ICE\_T}$.

Figure 6:
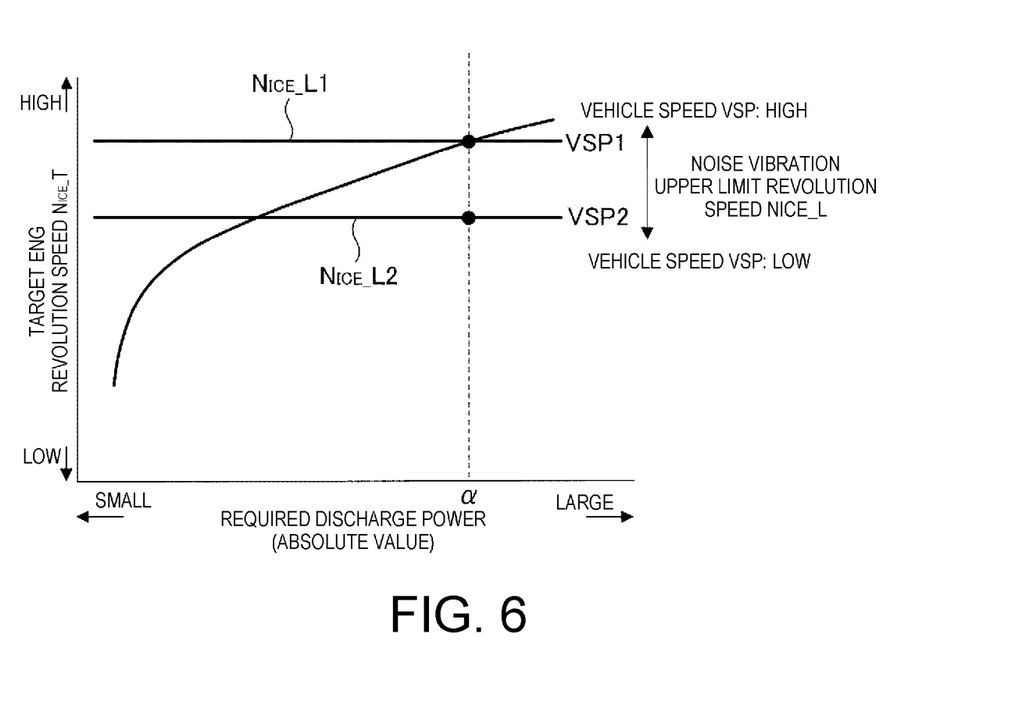
FIG. 6 is a diagram showing map data of a target ENG revolution speed.

FIG. 6 is a diagram showing map data of the target ENG revolution speed $N_{ICE\_T}$ according to the required discharge power. FIG. 6 shows the map data of the target ENG revolution speed $N_{ICE\_T}$ at the time of the retard discharge. In FIG. 6, the required discharge power is shown in absolute value. The map data at the time of the retard discharge is set based on a torque characteristic of the ENG torque $TQ_{ICE}$ that can be generated for each ENG revolution speed $N_{ICE}$. In the torque characteristic at the time of the retard discharge, the absolute value of the ENG torque $TQ_{ICE}$ tends to increase as the ENG revolution speed $N_{ICE}$ increases similarly to the general engine friction torque characteristic, and the power is proportional to the ENG revolution speed $N_{ICE}$ and the ENG torque $TQ_{ICE}$. For this reason, the map data at the time of the retard discharge has a characteristic that the target ENG revolution speed $N_{ICE\_T}$ becomes higher as the required discharge power is larger in absolute value. In FIG. 6, the map data is set under the condition that the absolute value of the ENG torque $TQ_{ICE}$ at the time of the retard discharge is the smallest.

The map data at the time of the retard discharge has such characteristics as a result of reflecting a power consumption characteristic during the retard discharge, the map data at the time of the retard discharge and the map data at the time of the motoring are prepared separately. Therefore, in the ENG operation point calculation unit 36, the target ENG revolution speed $N_{ICE\_T}$ is calculated based on the power consumption characteristic during the retard discharge by referring to the map data shown in FIG. 6.

The map data of the target ENG revolution speed $N_{ICE\_T}$ is corrected according to the ENG oil temperature $T_{OIL}$, and the friction of the engine 1 increases as the ENG oil temperature $T_{OIL}$ decreases. Therefore, the lower the ENG oil temperature $T_{OIL}$, the lower the target ENG revolution speed $N_{ICE\_T}$ for the same required discharge power. For this reason, in the ENG operation point calculation unit 36, the lower the ENG oil temperature $T_{OIL}$, the lower the target ENG revolution speed $N_{ICE\_T}$ for the same required discharge power is corrected.

As described above, the map data at the time of the retard discharge may be further set according to a parameter representing a variation factor of the ENG torque $TQ_{ICE}$ such as the ENG oil temperature $T_{OIL}$. By considering the variation factor of the ENG torque $TQ_{ICE}$, the target ENG revolution speed $N_{ICE\_T}$ based on the torque characteristic closer to the actual characteristic can be calculated. For this reason, it is possible to prevent the target ENG revolution speed $N_{ICE\_T}$ from being unnecessarily increased.

The target ENG revolution speed $N_{ICE\_T}$ is further limited by a noise vibration upper limit revolution speed $N_{ICE\_L}$ from the viewpoint of noise vibration. The noise vibration upper limit revolution speed $N_{ICE\_L}$ is set in advance in accordance with the vehicle speed VSP, and increases as the vehicle speed VSP increases.

In the example shown in FIG. 6, when the required discharge power is a predetermined value α in absolute value and the vehicle speed VSP is a first vehicle speed VSP1, the target ENG revolution speed $N_{ICE\_T}$ matches the noise vibration upper limit revolution speed $N_{ICE\_L1}$ at the first vehicle speed VSP1. As a result, the target ENG revolution speed $N_{ICE\_T}$ does not exceed the noise vibration upper limit revolution speed $N_{ICE\_L1}$, and thus is not limited to the noise vibration upper limit revolution speed $N_{ICE\_L1}$. When the required discharge power is the predetermined value α and the vehicle speed VSP is a second vehicle speed VSP2 smaller than the first vehicle speed VSP1, the target ENG revolution speed $N_{ICE\_T}$ exceeds the noise vibration upper limit revolution speed $N_{ICE\_L2}$ at the second vehicle speed VSP2. For this reason, in this case, the target ENG revolution speed $N_{ICE\_T}$ is limited to the noise vibration upper limit revolution speed $N_{ICE\_L2}$.

Returning to FIG. 5, in the ENG operation point calculation unit 36, the target ENG revolution speed $N_{ICE\_T}$ to which the correction based on the ENG oil temperature $T_{OIL}$ and the limitation based on the noise vibration upper limit revolution speed $N_{ICE\_L}$ are applied is calculated as the final target ENG revolution speed $N_{ICE\_T}$.

The target ENG revolution speed $N_{ICE\_T}$ calculated by the ENG operation point calculation unit 36 is input to a generator controller 12. The generator controller 12 controls the generator 2 based on the input target ENG revolution speed $N_{ICE\_T}$. Accordingly, the power consumption, that is, discharge is performed by motoring or retard discharge of the engine 1. The generator controller 12 constitutes the motor controller 10 together with a drive motor controller 11.

The ENG operation mode determination unit 37 determines an operation mode of the engine 1 based on the input. When the target power $EP_{ICE\_T}$ is negative and the retard discharge flag is ON, the ENG operation mode determination unit 37 sets an ENG operation mode flag to the retard discharge. In addition, in the ENG operation mode determination unit 37, the ENG operation mode flag is set to the power generation operation when the target power $EP_{ICE\_T}$ is positive, and the ENG operation mode flag is set to the motoring when the target power $EP_{ICE\_T}$ is negative and the retard discharge flag is OFF.

In addition to the target power $EP_{ICE\_T}$ and the retard discharge flag, permitted output power POUT of the battery 6 is further input to the ENG operation mode determination unit 37. The permitted output power POUT is power that can be output from the battery 6, and the ENG operation mode flag is set to the retard discharge when the permitted output power POUT is larger than a predetermined value POUT1.

The predetermined value POUT1 is a value for preventing an over-discharge state of the battery 6 due to a factor other than the SOC such as an environmental factor, and is set in advance. Even when the SOC is larger than the SOC at which the power generation request is made, for example, when the temperature of the battery 6 is extremely high or extremely low, the permitted output power POUT decreases.

The case where the permitted output power POUT is equal to or less than the predetermined value POUT1 corresponds to the case where the battery 6 is in the over-discharge state. For this reason, in this case, the operation mode flag of the engine 1 can be set to the power generation operation.

The ENG operation mode flag is input from the ENG operation mode determination unit 37 to the engine controller 20. The target ENG torque $TQ_{ICE\_T}$ calculated by the ENG operation point calculation unit 36 is also input to the engine controller 20.

The engine controller 20 controls the engine 1 based on the input target ENG torque $TQ_{ICE\_T}$ and the input ENG operation mode flag. Accordingly, when power is generated, the generator 2 is driven by the engine 1. When the retard discharge is performed, combustion in which the ignition timing is retarded is performed in the engine 1.

As described above, the ENG operation mode flag is set to the retard discharge when the permitted output power POUT is larger than the predetermined value POUT1. For this reason, in a case where the permitted output power POUT is larger than the predetermined value POUT1, even when a request for idol speed control (ISC) of the engine 1 is made, the retard discharge is performed in preference to the ISC request.

In addition to the retard discharge flag, the ENG operation mode flag set by the ENG operation mode determination unit 37, the ENG revolution speed $N_{ICE}$, the ENG oil temperature $T_{OIL}$, and the vehicle speed VSP are input to the ENG power consumption calculation unit 38. When the ENG operation mode is the motoring or the retard discharge, the ENG power consumption calculation unit 38 calculates ENG power consumption that is power consumption obtained by the motoring or the retard discharge. In other words, the ENG power consumption is power consumption of a power generation unit including the engine 1 and the generator 2.

When the retard discharge flag is ON, the power consumption obtained by the retard discharge is calculated as the ENG power consumption. When the retard discharge flag is OFF, the power consumption obtained by the motoring is calculated as the ENG power consumption. The calculated ENG power consumption is a calculated value of power consumption obtained by the retard discharge or the motoring, and corresponds to an estimated power consumption value.

The ENG power consumption is calculated based on the ENG revolution speed $N_{ICE}$. The ENG power consumption is negative, and the higher the ENG revolution speed $N_{ICE}$ is, the larger the ENG power consumption is calculated in absolute value. The ENG power consumption is set in advance by map data according to the ENG revolution speed $N_{ICE}$. As the map data, map data referred to at the time of motoring and map data referred to at the time of retard discharge are separately prepared.

In the map data of the ENG power consumption at the time of the retard discharge, the target ENG revolution speed $N_{ICE\_T}$ is replaced with the ENG revolution speed $N_{ICE}$ in the map data shown in FIG. 6, and the required discharge power is replaced with the ENG power consumption. Therefore, the ENG power consumption calculation unit 38 calculates the ENG power consumption based on the power consumption characteristic during the retard discharge according to the ENG revolution speed $N_{ICE}$ by referring to the map data of the ENG power consumption at the time of the retard discharge. The ENG power consumption is corrected based on the ENG oil temperature $T_{OIL}$, and the corrected ENG power consumption is calculated as the final ENG power consumption. For the same ENG revolution speed $N_{ICE}$, the lower the ENG oil temperature $T_{OIL}$, the larger the ENG power consumption is corrected in absolute value.

At the time of transition from the retard discharge to the motoring, the ENG power consumption calculation unit 38 gradually changes the ENG power consumption from the ENG power consumption obtained by the retard discharge to the ENG power consumption obtained by the motoring. The ENG power consumption constantly obtained by the motoring is larger in absolute value than the ENG power consumption constantly obtained by the retard discharge. For this reason, the ENG power consumption calculation unit 38 gradually increases the ENG power consumption in absolute value during the transition. The ENG power consumption calculation unit 38 further changes a power change rate according to the vehicle speed VSP during the transition as described below.

Figure 7:
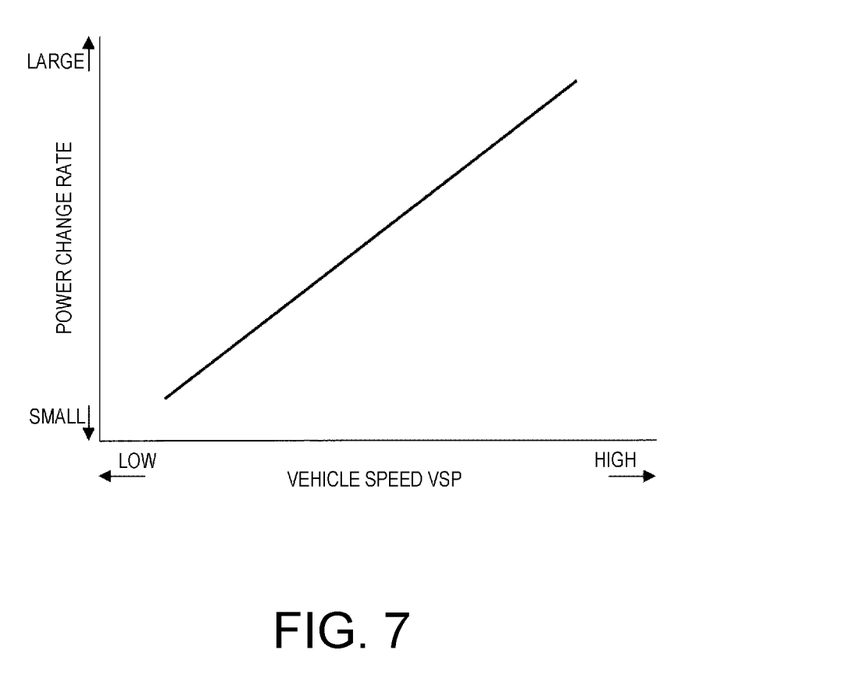
FIG. 7 is a diagram showing a power change rate according to a vehicle speed.

FIG. 7 is a diagram showing the power change rate according to the vehicle speed VSP. The power change rate is a change rate of the ENG power consumption at the time of transition from the retard discharge to the motoring, and the power change rate increases as the vehicle speed VSP increases. Accordingly, the higher the vehicle speed VSP, the faster the transition from the retard discharge to the motoring is performed.

Returning to FIG. 5, in addition to the ENG power consumption calculated by the ENG power consumption calculation unit 38, the auxiliary machine power consumption and the permitted input power PIN are input to the regenerative torque limit calculation unit 39. The permitted input power PIN is power that can be input to the battery 6, and is zero or a negative value. The regenerative torque limit calculation unit 39 calculates an allowable regenerative torque $TQ_{MOT\_L}$ of the drive motor 3 based on a sum of the ENG power consumption, the auxiliary machine power consumption, and the permitted input power PIN.

The sum of the ENG power consumption, the auxiliary machine power consumption, and the permitted input power PIN constitutes system regenerative maximum power P MAX. The system regenerative maximum power P MAX is the maximum power in absolute value that can be regenerated in the vehicle 100, and indicates the maximum power that can be accepted by the vehicle 100. In the regenerative torque limit calculation unit 39, a regenerative torque corresponding to the system regenerative maximum power P MAX is calculated as an allowable regenerative torque $TQ_{MOT\_L}$. Regeneration cannot be performed with a drive torque $Q_{MOT}$ that is larger in absolute value than the allowable regenerative torque $TQ_{MOT\_L}$. Therefore, the allowable regenerative torque can be said to be a regenerative limit torque. The calculated allowable regenerative torque $TQ_{MOT\_L}$ is input to the regenerative torque limiting unit 40.

The regenerative torque limiting unit 40 limits the target drive torque $TQ_{MOT\_T}$ of the drive motor 3 based on the input allowable regenerative torque $TQ_{MOT\_L}$. The target drive torque $TQ_{MOT\_T}$ represents a target regenerative torque in the case of negative. When the negative target drive torque $TQ_{MOT\_T}$ is equal to or less than the allowable regenerative torque $TQ_{MOT\_T}$, the target drive torque $TQ_{MOT\_T}$ is limited to the allowable regenerative torque $TQ_{MOT\_L}$. In the regenerative torque limiting unit 40, the target drive torque $TQ_{MOT\_T}$ is limited by an allowable regenerative torque $TQ_{MOT\_Lr}$ at the time of the retard discharge, so that the regenerative torque is limited according to the ENG power consumption due to the retard discharge.

The target drive torque $TQ_{MOT\_T}$ after the limitation is applied is input to the drive motor controller 11 as the final target drive torque $TQ_{MOT\_T}$, and the drive motor controller 11 drives the drive motor 3 based on the input target drive torque $TQ_{MOT\_T}$. When the target drive torque $TQ_{MOT\_T}$ is negative, regeneration is performed. The target drive torque $TQ_{MOT\_T}$ after the limitation is applied is also input to the target drive power calculation unit 32.

Figure 8:
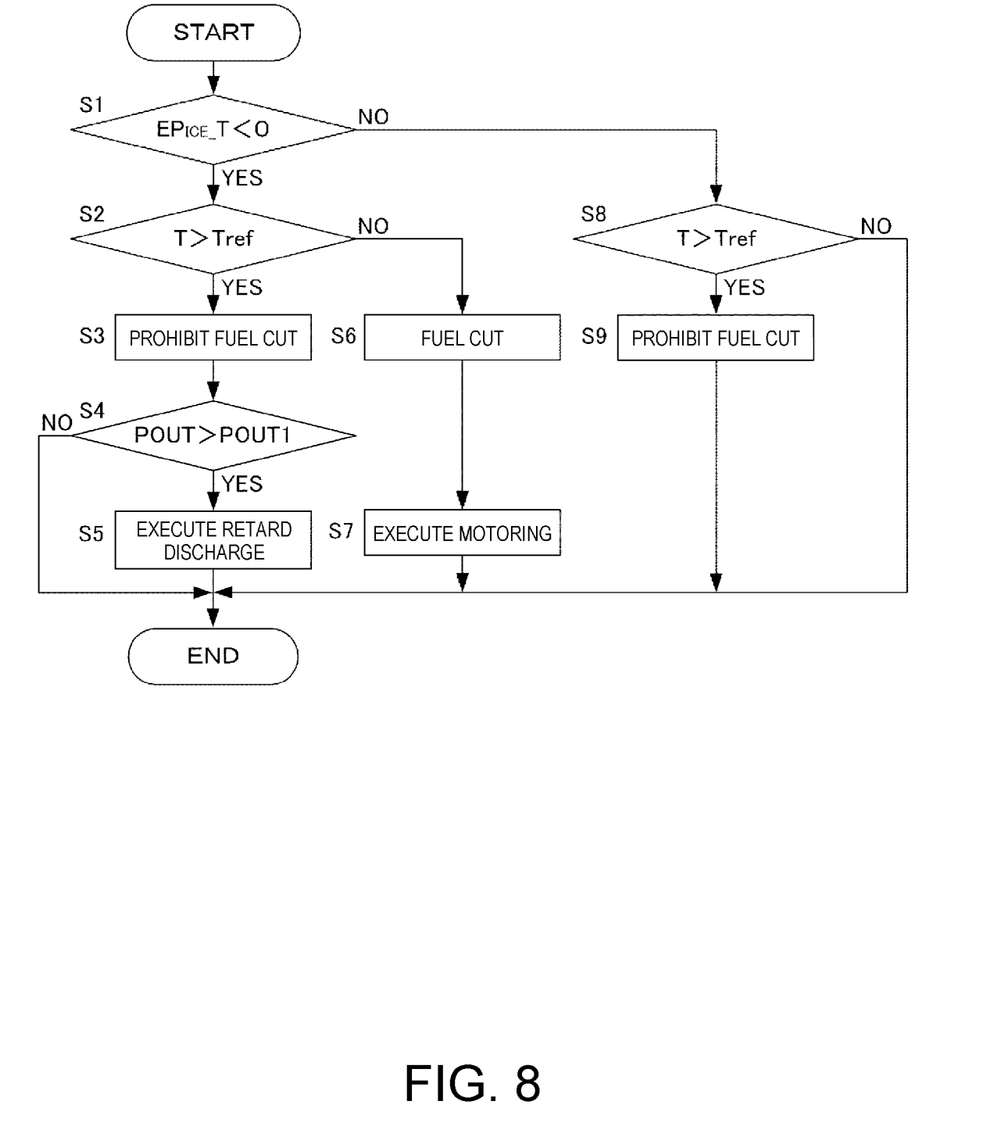
FIG. 8 is a flowchart showing an example of discharge control.

FIG. 8 is a flowchart showing an example of discharge control performed by the controller 50. FIG. 8 shows a case where the drive mode is the S mode. The controller 50 performs the processing of the flowchart shown in FIG. 8, and thus a control unit is functionally implemented. The processing of the flowchart shown in FIG. 8 can be repeatedly executed.

In step S1, the controller 50 determines whether the target power $EP_{ICE\_T}$ is less than zero. If an affirmative determination is made in step S1, it is determined that the target power $EP_{ICE\_T}$ is the target discharge power and there is a discharge request. The discharge request is a discharge request for causing the generator 2 to perform discharge, and the generator 2 performs discharge by driving the engine 1 based on such a discharge request. The target power $EP_{ICE\_T}$ becomes negative, for example, when the target drive power $EP_{MOT\_T}$ becomes negative and there is no power generation request or discharge prohibition request having a higher priority than the target drive power $EP_{MOT\_T}$. Therefore, when there is a discharge request, for example, the discharge is performed at the time of regeneration including the start of regeneration.

The case where the target power $EP_{ICE\_T}$ is less than zero includes a case where the battery 6 is fully charged. In the case where the battery 6 is fully charged, negative power corresponding to the SOC control power request is added to the negative target drive power $EP_{MOT\_T}$, and as a result, the target power $EP_{ICE\_T}$ becomes less than zero. If an affirmative determination is made in step S1, the processing proceeds to step S2.

In step S2, the controller 50 determines whether the GPF temperature T is higher than the threshold value Tref. That is, it is determined whether the fuel cut prohibition condition is satisfied. If an affirmative determination is made in step S2, the GPF state flag is set to ON, and the controller 50 prohibits the fuel cut in step S3.

In step S4, the controller 50 determines whether the permitted output power POUT of the battery 6 is larger than the predetermined value POUT1. If a negative determination is made in step S4, the processing is temporarily ended. In this case, the battery 6 is determined to be in an over-discharge state, and thus the power generation operation of the engine 1 can be performed. If an affirmative determination is made in step S4, the battery 6 is determined not to be in an over-discharge state, and the processing proceeds to step S5.

In step S5, the controller 50 executes the retard discharge. Accordingly, it is possible to discharge the battery 6 while suppressing overheating of the GPF, thereby increasing the room for regeneration. Therefore, even when the fuel cut is prohibited and the battery 6 is fully charged, it is possible to obtain the deceleration by the regeneration.

If a negative determination is made in step S2, the GPF state flag is OFF, and the controller 50 executes the fuel cut of the engine 1 in step S6 and executes the motoring in step S7. That is, in this case, the GPF does not overheat even when the motoring is performed, and thus the battery 6 is discharged by the motoring. In this case, regeneration corresponding to a discharge amount can be performed by the motoring, and thus the deceleration larger in absolute value than that in the case of performing the retard discharge is secured.

When the retard discharge was performed in the previous routine, the transition from the retard discharge to the motoring is started in step S7. At this time, the controller 50 gradually changes the ENG power consumption. The controller 50 gradually changes the ENG power consumption from the ENG power consumption obtained by the retard discharge to the ENG power consumption obtained by the motoring. The gradual change of the ENG power consumption is continuously performed until the ENG power consumption reaches the ENG power consumption obtained by the motoring. After step S7, the processing temporarily ends.

If a negative determination is made in step S1, the discharge request is eliminated. For this reason, the retard discharge and the motoring are stopped. If a negative determination is made in step S1, it is determined in step S8 whether the GPF temperature T is higher than the threshold value Tref. If an affirmative determination is made in step S8, the fuel cut is prohibited in step S9. In this case, the power generation operation of the engine 1 can be performed. If a negative determination is made in step S8, the processing is temporarily ended. In this case, since the GPF state flag is OFF and the fuel cut is permitted, the power generation operation and the operation stop of the engine 1 can be performed.

The processing from step S1 to step S4, step S8, and step S9 can be performed by the vehicle controller 30. The processing of step S5 can be performed by the motor controller 10 and the engine controller 20. The processing of step S6 can be performed by the engine controller 20, and the processing of step S7 can be performed by the motor controller 10.

Figure 9:
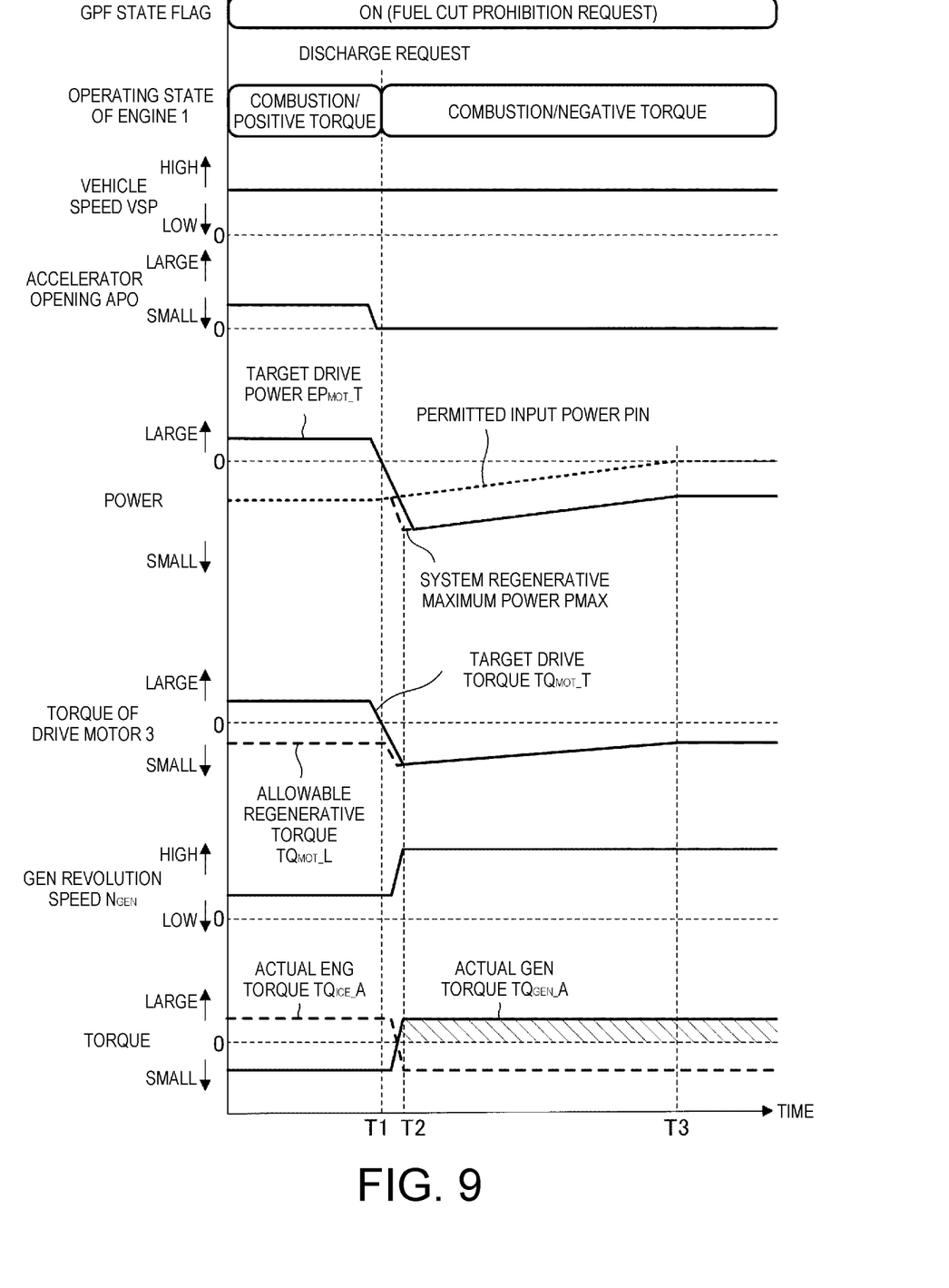
FIG. 9 is a diagram showing a first example of a timing chart corresponding to FIG. 8.

FIG. 9 is a diagram showing a first example of a timing chart corresponding to FIG. 8. FIG. 9 shows a case where the retard discharge is performed. Before a timing T1, the vehicle 100 travels on an upslope at a constant vehicle speed VSP. The accelerator opening APO is larger than zero, and the target drive torque $TQ_{MOT\_T}$ of the drive motor 3 and the target drive power $EP_{MOT\_T}$ corresponding to the target drive torque $TQ_{MOT\_T}$ are positive. The GPF state flag is ON, and an operating state of the engine 1 is a positive torque operation in which a positive torque is generated by combustion. For this reason, an actual ENG torque $TQ_{ICE\_A}$ of the engine 1 is positive, and an actual GEN torque $TQ_{GEN\_A}$ of the generator 2 is negative. As a result of the engine 1 driving the generator 2, a GEN revolution speed $N_{GEN}$ of the generator 2 is greater than zero.

Before the timing T1, the vehicle 100 approaches a downhill. For this reason, the constant accelerator opening APO starts to decrease, and accordingly, the target drive torque $TQ_{MOT\_T}$ and the target drive power $EP_{MOT\_T}$ also start to decrease. The accelerator opening APO becomes zero before the timing T1, and the target drive torque $TQ_{MOT\_}T$ becomes negative accordingly, so that the target drive power $EP_{MOT\_}T$ becomes negative at the timing T1.

As a result, the regeneration is started, and the discharge request is made in a fuel cut prohibition state. For this reason, the retard discharge is also started, and the operating state of the engine 1 becomes a negative torque operation in which a negative torque is generated in a combustion state. Since the regeneration is started, the permitted input power PIN of the battery 6 starts to gradually decrease in absolute value.

When the retard discharge is started, the ignition timing of the engine 1 is retarded, and the GEN revolution speed $N_{GEN}$ is increased. For this reason, the actual ENG torque $TQ_{ICE\_}A$ decreases, and the actual GEN torque $TQ_{GEN\_}A$ increases. As a result, the actual ENG torque $TQ_{ICE\_}A$ becomes negative, and the actual GEN torque $TQ_{GEN\_}A$ becomes positive. When the actual ENG torque $TQ_{ICE\_}A$ becomes constant at a timing T2, the GEN revolution speed $N_{GEN}$ and the actual GEN torque $TQ_{GEN\_}A$ also become constant. The hatching indicates a magnitude of the power discharged by the generator 2.

When the retard discharge is started, the allowable regenerative torque $TQ_{MOT\_}L$ and the system regenerative maximum power P MAX decrease (increase in absolute value) by the amount of discharge due to the retard discharge. The target drive torque $TQ_{MOT\_}T$ is further limited by the allowable regenerative torque $TQ_{MOT\_}L$, and decreases to the allowable regenerative torque $TQ_{MOT\_}L$. The target drive power $EP_{MOT\_}T$ decreases to the system regenerative maximum power P MAX. As a result, a regeneration amount increases by the amount of discharge due to the retard discharge.

Accordingly, the deceleration larger in absolute value than that in the case of not performing the retard discharge is secured. In addition, even when the permitted input power PIN of the battery 6 becomes zero and fully charged at a timing T3 due to an increase in room for regeneration by the amount of discharge due to the retard discharge, the allowable regenerative torque $TQ_{MOT\_}L$ and the target drive power $EP_{MOT\_}T$ do not become zero, and the deceleration is ensured.

Figure 10:
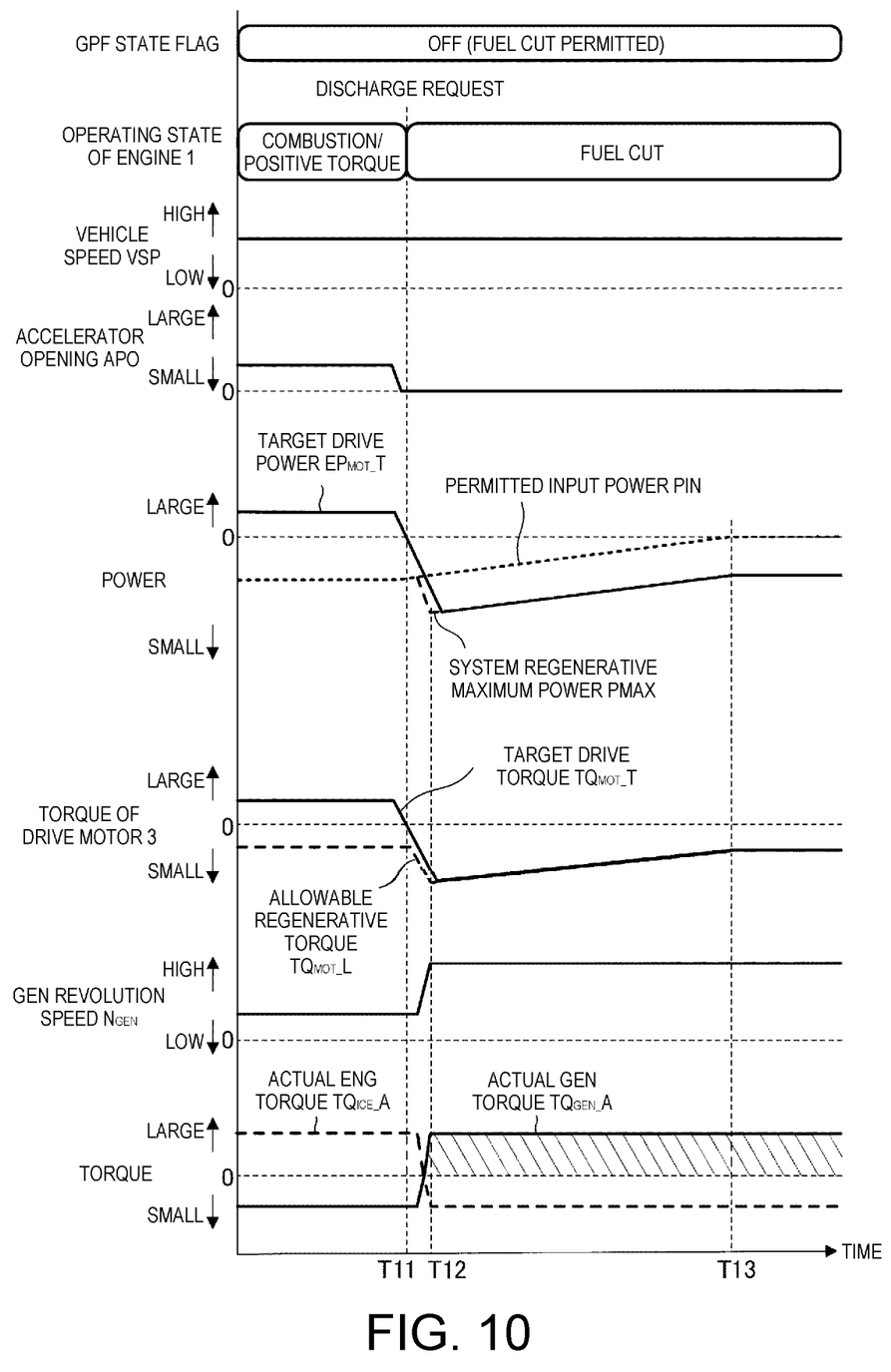
FIG. 10 is a diagram showing a second example of the timing chart corresponding to FIG. 8.

FIG. 10 is a diagram showing a second example of the timing chart corresponding to FIG. 8. FIG. 10 shows a case where the motoring is performed. A state before a timing T11 is the same as that in FIG. 9 except that the GPF state flag is OFF. At the timing T11, the discharge request is made in a state in which the fuel cut is not prohibited. As a result, in response to the discharge request, the motoring is started, and the operating state of the engine 1 becomes a fuel cut state, that is, an operation stop state.

In the motoring, the engine 1 in an operation stop state is driven by the generator 2, and power is consumed more than in the retard discharge. For this reason, the discharge power of the generator 2 indicated by hatching becomes larger than that in the case of FIG. 9, and the allowable regenerative torque $TQ_{MOT\_}L$ and the system regenerative maximum power P MAX also become larger in absolute value than those in the case of FIG. 9. As a result, the target drive torque $TQ_{MOT\_}T$ and the target drive power $EP_{MOT\_}T$ are also larger in absolute value than those in FIG. 9, including the case where the permitted input power PIN becomes zero at a timing T13. Therefore, the deceleration larger in absolute value than that in the case of the retard discharge is secured.

Figure 11:
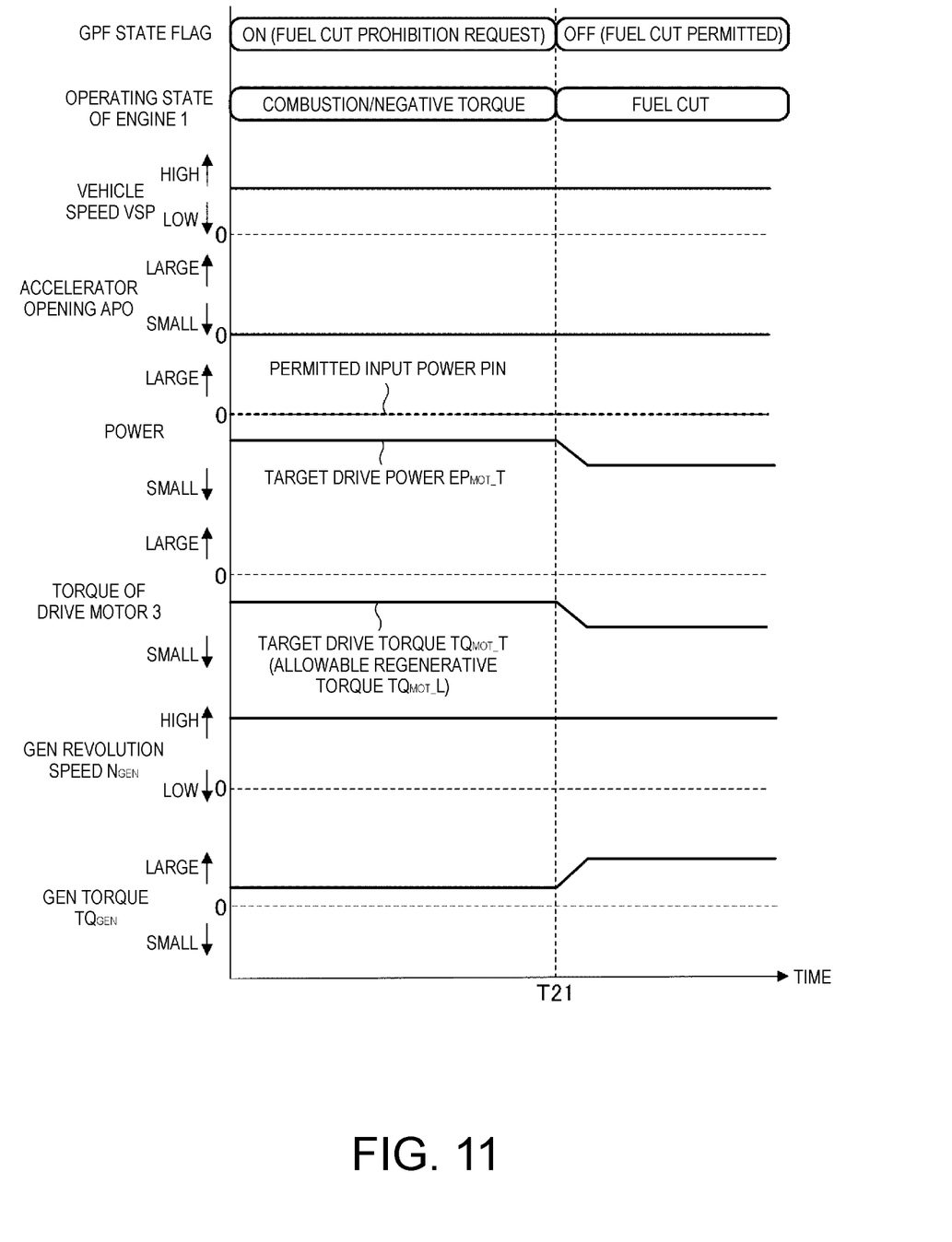
FIG. 11 is a diagram showing a third example of the timing chart corresponding to FIG. 8.

FIG. 11 is a diagram showing a third example of the timing chart corresponding to FIG. 8. FIG. 11 shows a transition from the retard discharge to the motoring. Before a timing T21, the fuel cut of the engine 1 is prohibited, and the retard discharge is performed as the negative torque operation. In the retard discharge, the engine 1, which is undergoing combustion, is driven by the generator 2. For this reason, the GEN torque $TQ_{GEN}$ of the generator 2 is larger than zero. The vehicle 100 travels on a downhill at a constant vehicle speed VSP and performs regeneration. For this reason, the accelerator opening APO is zero, and the target drive torque $TQ_{MOT\_}T$ and the target drive power $EP_{MOT\_}T$ are negative. The target drive torque $TQ_{MOT\_}T$ is limited to the allowable regenerative torque $TQ_{MOT\_}L$.

At a timing T21, the GPF state flag changes from ON to OFF. For this reason, the fuel cut of the engine 1 is performed and the motoring is started. As a result, the transition from the retard discharge to the motoring is performed. Accordingly, the target drive torque $TQ_{MOT\_}T$ and the target drive power $EP_{MOT\_}T$ decrease and the absolute values thereof increase, and thus the GEN torque $TQ_{GEN}$ also increases.

At this time, the ENG power consumption is gradually changed from the ENG power consumption obtained by the retard discharge to the ENG power consumption obtained by the motoring. Accordingly, the allowable regenerative torque $TQ_{MOT\_}L$ gradually decreases, and as a result, the target drive torque $TQ_{MOT\_}T$ gradually decreases while being limited to the allowable regenerative torque $TQ_{MOT\_}L$. As a result, deceleration having a maximum potential that can be achieved by the motoring can be obtained while suppressing the driver from feeling uncomfortable.

Next, main functions and effects of the present embodiment will be described.

In the present embodiment, a method for controlling the vehicle 100 including the engine 1, the generator 2, the drive motor 3, and the GPF system 7 that collects soot which is particulate matter in exhaust gas of the engine 1, in which the generator 2 is driven by the engine 1 to generate power, and the drive motor 3 is driven with the power generated by the generator 2, the method including: performing motoring by driving the engine 1 in an operation stop state with the generator 2, thereby performing fuel cut of the engine 1 and consuming power; on the other hand, prohibiting fuel cut of the engine 1 based on the GPF temperature T; and when a discharge request is made while the fuel cut of the engine 1 is prohibited, performing retard discharge that is a power consumption operation in which a negative ENG torque $TQ_{ICE}$ is generated in the engine 1 by driving the engine 1 with the generator 2 while performing combustion in the engine 1.

According to such a method, by performing the retard discharge in response to the discharge request, the discharge can be performed even during the fuel cut prohibition in which the GPF may overheat due to oxygen supply. For this reason, the discharge can be performed while protecting the GPF. As a result, it is possible to increase the room for regeneration at the time of regeneration even when the fuel cut is prohibited, and it is possible to ensure deceleration.

In the present embodiment, in a case where the permitted output power POUT of the battery 6 is larger than the predetermined value POUT1 even when the ISC request of the engine 1 is made, the retard discharge is preferentially performed. According to such a method, it is possible to perform retard combustion while preventing the battery 6 from entering an over-discharge state due to a factor other than the SOC. For this reason, even when the battery 6 may be in an over-discharge state due to a factor other than the SOC, it is possible to secure power for starting the engine 1 next time, and it is possible to prevent drive assist power supplied from the battery 6 from decreasing.

In the present embodiment, at the time of transition from the retard discharge to the motoring of the engine 1, the ENG power consumption is gradually changed from the ENG power consumption obtained by the retard discharge to the ENG power consumption obtained by the motoring. According to such a method, it is possible to obtain deceleration having a maximum potential that can be achieved by the motoring while suppressing the driver from feeling uncomfortable at the time of transition from the retard discharge to the motoring of the engine 1.

In the present embodiment, the target ENG revolution speed $N_{ICE\_}T$ is calculated based on the power consumption characteristic during the retard discharge by referring to the map data of the target ENG revolution speed $N_{ICE\_}T$ at the time of the retard discharge shown in FIG. 6. The target ENG revolution speed $N_{ICE\_}T$ is corrected according to the ENG oil temperature $T_{OIL}$. According to such a method, the deceleration can be ensured while satisfying the discharge power required during the retard discharge.

In the present embodiment, the negative target drive torque $TQ_{MOT\_}T$ is limited by the allowable regenerative torque $TQ_{MOT\_}L$, and as a result, the regenerative torque of the drive motor 3 is limited according to the ENG power consumption due to the retard discharge. According to such a method, the regenerative power can be limited in accordance with the ENG power consumption due to the retard discharge, and thus it is possible to continuously generate the deceleration while preventing the battery 6 from being fully charged.

Although the embodiment of the present invention has been described above, the above embodiment is merely a part of application examples of the present invention, and is not intended to limit the technical scope of the present invention to the specific configurations of the above embodiment.

For example, the power consumption operation may be a negative torque operation in which the engine 1 is driven by the generator 2 during idling operation to generate a negative torque in the engine 1.

The invention claimed is:

1. A method for controlling a hybrid vehicle, comprising:
   driving a generator using an engine to generate power;
   driving a drive motor using the power generated by the generator;
   collecting, using a filter, a particulate matter in an exhaust gas of the engine;
   determining whether or not a target power is lower than zero;
   determining whether or not a temperature of the filter is higher than a predetermined threshold temperature, when the target power is determined to be lower than zero;
   prohibiting fuel cut for the engine when the temperature of the filter is determined to be higher than the threshold temperature;
   performing a power consumption operation in which a negative engine torque is generated in the engine by driving the engine with the generator while performing combustion in the engine, in response to prohibiting the fuel cut for the engine, wherein the power consumption operation includes retard discharge;
   performing fuel cut for the engine when the temperature of the filter is determined to be not higher than the threshold temperature; and
   performing motoring during the fuel cut, wherein the motoring includes driving the engine using the generator.

2. The method for controlling the hybrid vehicle according to claim 1, wherein a power consumption operation is preferentially performed when permitted output power of a battery is larger than a predetermined value even in a case where there is a request for idle speed control of the engine.

3. The method for controlling the hybrid vehicle according to claim 1, wherein at a time of transition from a power consumption operation to the motoring of the engine, an estimated power consumption value is gradually changed from an estimated value of power consumption obtained by the power consumption operation to an estimated value of power consumption obtained by the motoring.

4. The method for controlling the hybrid vehicle according to claim 1, wherein a target revolution speed of the engine is calculated based on a power consumption characteristic during a power consumption operation, and the target revolution speed is corrected according to an oil temperature of the engine.

5. The method for controlling the hybrid vehicle according to claim 1, wherein a regenerative torque of the drive motor is limited according to power consumption due to a power consumption operation.

6. The method for controlling the hybrid vehicle according to claim 1, wherein a regenerative torque of the drive motor is limited according to power consumption due to a power consumption operation:
   a control unit configured to:
      perform motoring during fuel cut of the engine to consume power, wherein the motoring includes driving the engine of an operation stop state by the generator,
      prohibit fuel cut based on a temperature of the filter, and
      when a discharge request of a battery is made while the fuel cut of the engine is prohibited, execute a power consumption operation in which a negative engine torque is generated in the engine by driving the engine with the generator while performing combustion in the engine.

7. The method for controlling the hybrid vehicle according to claim 1, wherein a negative engine torque means an engine torque which is smaller than a friction torque.

* * * * *